(12) United States Patent
Bourg, Jr. et al.

(10) Patent No.: US 8,569,662 B2
(45) Date of Patent: Oct. 29, 2013

(54) OIL STRIPPING FRYER UNIT

(75) Inventors: Wilfred Marcellien Bourg, Jr., Melissa, TX (US); Donald Vaughn Neel, Highland Village, TX (US); Jennifer Bell Raymond, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 24 days.

(21) Appl. No.: 13/406,998

(22) Filed: Feb. 28, 2012

(65) Prior Publication Data

US 2012/0156359 A1     Jun. 21, 2012

Related U.S. Application Data

(62) Division of application No. 12/263,861, filed on Nov. 3, 2008, now Pat. No. 8,148,668.

(51) Int. Cl.
*F27D 11/00*     (2006.01)
*A23L 1/00*     (2006.01)

(52) U.S. Cl.
USPC .......... 219/430; 219/385; 219/386; 219/387; 219/401; 426/438; 426/637; 426/441; 426/615; 426/618; 99/404; 99/330; 99/353; 99/407; 99/355

(58) Field of Classification Search
USPC .......... 219/430, 385–387, 401; 426/560, 438, 426/637, 417, 441, 475, 439, 465, 455; 99/404, 330, 353, 407–8, 355
See application file for complete search history.

(56) References Cited

U.S. PATENT DOCUMENTS

| 4,721,625 A | * | 1/1988 | Lee et al. ............... 426/438 |
| 5,132,126 A | | 7/1992 | Sinkler |
| 2010/0040750 A1 | | 2/2010 | Assaad |

FOREIGN PATENT DOCUMENTS

JP          08252177 A     10/1996

OTHER PUBLICATIONS

English translation of JP 08252177A, Publication Date Oct. 1, 1996, translated from Japanese Patent Office website (16 pages).
English translation of portions of JP 08252177A, Publication Date Oct. 1, 1996, provided by WPI/Thomson (4 pages).

* cited by examiner

*Primary Examiner* — Shawntina Fuqua
(74) *Attorney, Agent, or Firm* — Bobby W. Braxton; Colin P. Cahoon; Carstens & Cahoon, LLP

(57) ABSTRACT

A continuous oil fryer used to fry food slices, such as potato chips, having an internal oil stripping capability. The fryer accumulates the steam produced by the frying process in a hood and utilizes such steam, after superheating the steam by passing it through a heat exchanger, to strip oil from product immediately upon removal from the hot oil bath by passing the superheated steam through a product bed while on an output conveyor. The superheated steam removes oil from the product on the output conveyor without increasing the moisture level of the product. The fryer therefore accomplishes the same function as a low-oil stripper without increasing the footprint of the frying unit and with less energy.

16 Claims, 3 Drawing Sheets

US 8,569,662 B2

OIL STRIPPING FRYER UNIT

PRIORITY CLAIM

This application is a divisional of co-pending U.S. patent application Ser. No. 12/263,861, filed Nov. 3, 2008, entitled "Oil Stripping Fryer Unit," the technical disclosure of which is hereby incorporated by reference in its entirety.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

1. Technical Field

The present invention relates to a fryer assembly having an oil stripping capability integral to the unit. More particularly, the invention relates to the extension of the steam collection hood on a chip frying unit and the incorporation of oil stripping features in such extended hood, thereby eliminating the need for a separate low-fat stripping unit.

2. Description of Related Art

Food pieces, such as potato chips, are commonly cooked in hot oil in a fryer, such as a Heat and Control PC-50 fryer. A simplified schematic illustration of such a continuous fryer is shown in FIG. 1.

Referring to FIG. 1, the food pieces, such as potato slices, are inserted into the fryer unit by means of a infeed conveyor 102. The slices then float in the hot oil 104 until removed from the fryer unit by an output conveyor 106. Agitation paddles (not shown) and a submerger 105 can be used to keep the slices from clumping together and floating to the surface of the oil 104. The fried food pieces on the output conveyor 106 are in a bed arrangement, as opposed to single chips in a monolayer arrangement, and are therefore referred to as a product bed 120 on the conveyor 106.

The food pieces are dehydrated during the frying process and, therefore, release moisture in the form of steam. This steam is collected by a hood 108 located above the oil 104. As shown in FIG. 1, it is common to exhaust the steam collected by such hood by one or more large exhaust fans 110 associated with one or more exhaust ports 112, as illustrated by the arrows within the hood 108. The steam temperature within such hood is typically in the range of 220° F. to 260° F., or normally about 240° F. The collected steam from the exhaust ports 112 is typically condensed, collected, and discarded or used in other unrelated processes. Thus, in most prior art applications the latent heat of the steam is essentially lost in the process.

Absent further processing to reduce the amount of oil in the chips produced by the fryer illustrated in FIG. 1, typically potato chips exit such fryer ready for seasoning and packaging with a total oil content by weight of approximately 36% and preferably a moisture level of about 1.1-1.5% by weight. In order to reduce the oil level of such chips, however, the chips can be routed directly from the frying unit illustrated in FIG. 1 by means of the output conveyor 106 to a low-fat stripping unit as illustrated in FIG. 2. This output conveyor 106 remains enclosed such that the fryer of FIG. 1 and the low-fat stripper of FIG. 2 are in communication with each other and each is a part of a single enclosed system.

FIG. 2 is a simplified schematic illustration of a prior art low-fat stripping system or unit, also referred to as a low-fat stripper, such as the model LFSS manufactured by Heat & Controls of Hayward, Calif. Product, such as potato chips, enters the low-fat stripper by means of an infeed conveyor 206, which has received the product from the output conveyor 106 of FIG. 1 or is simply a continuation of said output conveyor 106. The conveyor belt on such infeed conveyor 206 is porous, thereby allowing fluids, such as oil dripping off the product bed 220, to easily pass through the belt. Superheated steam is forced at high velocity through the product bed 220 while the product is on the infeed conveyor 206. This steam strips oil from the surface of the chips. The stripped oil drops to the base of the low-fat stripper or is carried with the steam as it exits the product bed 220.

The steam then flows through an oil separator 222 before being blown through a heat exchanger 224 to be reused again for stripping of the product bed 220. The heat exchanger 224 adds heat to the steam to keep it in a super-heated state. Steam is also constantly generated and added to the low-fat stripper to replace steam vented back to the fryer and lost elsewhere in the system. The steam is circulated throughout the entire unit (as illustrated by the arrows) by a high-volume fan 226. The stripped product exits the unit via an output conveyor 228.

The low-fat stripper recycles some of the steam it uses and removes some of the oil from the product. Potato chips made using a low-fat stripper typically have a finished oil content by weight of between 20% and 28% and a finished moisture level of about less than 2%.

The steam in the low-fat stripper is superheated to typically in the range of 290° F. to 320° F. The pressure in the low-fat stripper unit is maintained at approximately ambient conditions. The velocity of the steam as it blows onto the product bed is in the range of 1,500 ft./min. to 2,500 ft./min. The use of superheated steam in the stripper is important, because if steam at lower temperatures is used the product tends to absorb moisture from the steam. Adding moisture back into the product at this stage is generally undesirable, as it is preferred that the product exit the stripper at or below 2% moisture by weight for, among other reasons, longer shelf stability.

The low-fat stripper, as noted previously, is a separate unit from the fryer illustrated in FIG. 1. As a consequence, a product line that incorporates a low-fat stripper requires a larger plant footprint. In addition, the low-fat stripper is a capital expenditure above and beyond the cost of the fryer itself. There are energy costs as well when steam produced by the fryer is discarded while steam is constantly added and heated in the stripper.

Low-fat strippers such as the one described above require the use of large amounts of steam at very high velocities to effectively strip the product of a meaningful amount of oil. It is now understood that the reason for this high-energy requirement relates to the amount of time that it takes to get the product from the cooking oil 104 of FIG. 1 into the low-oil stripper of FIG. 2. During the transit time from the oil to the stripper, the product cools and continues to absorb oil. One of the mechanisms for reducing the oil in the chip is to heat the chip outside of the oil environment so that the dehydration of the chip drives the expulsion of oil from within the chip and off of its surface. In other words, the continued release of water vapor or steam from within the chip provides a mechanism for removing oil from the chip. When the chip is allowed to cool prior to exposure to superheated steam, much more energy or work is required to remove any substantial amount of oil from the chip. Unfortunately, since the oil stripper and the fryer are two separate units, the transit times between removal from the oil until entrance into the stripper can be in the range of 40 seconds to a minute or more. During that time, the chips cool considerably, making it that much more difficult to remove the oil from the chips.

Consequently, a need exists for combining the low-fat stripper capabilities of reducing the oil content of the finished fried chips with the basic equipment of existing fryers. This new apparatus should minimally affect the equipment footprint of a stand-alone fryer while utilizing the steam produced in situ. Such unit should amount to a decrease in energy usage, decrease in plant footprint, decrease in capital outlay per line, and yet provide finished product chips with a reduced fat content and low moisture content similar to chips produced when an oil stripper unit is used.

SUMMARY OF THE INVENTION

The present invention involves a modification to existing hooded fryer design in order to combine the functionality of a low-oil stripper with the fryer unit. In one embodiment of the present invention, the steam vents in the fryer hood over the hot oil are blocked off or restricted so that the steam accumulates in the hood as opposed to immediately venting. The steam is then drawn towards what is normally the exit end of the fryer by one or more fans positioned inside the hood or in an exhaust port at the exit end of the fryer. The steam is then passed through a heat exchanger, thereby pre-heating the steam to a superheated state, typically in the range of 300° F. to 310° F. This superheated steam is then passed through the product bed as the product is exiting the fryer on the output conveyor. Thus, the steam generated by frying the product is used to strip the product of excess oil all in the same unit.

The present invention is an improvement over the prior art in that combining the functionality of a low-oil stripper within a fryer hood reduces the overall equipment footprint and takes advantage of the steam produced in the fryer for use as the stripping steam. Applicants' invention decreases the overall energy use on a low-fat product line, decreases the plant footprint for such product line, and decreases the capital outlay required to set up such product line. Yet, Applicants' invention produces low-fat chips with the requisite low moisture levels.

These as well as additional features and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE PREFERRED EMBODIMENTS

Figure 1:
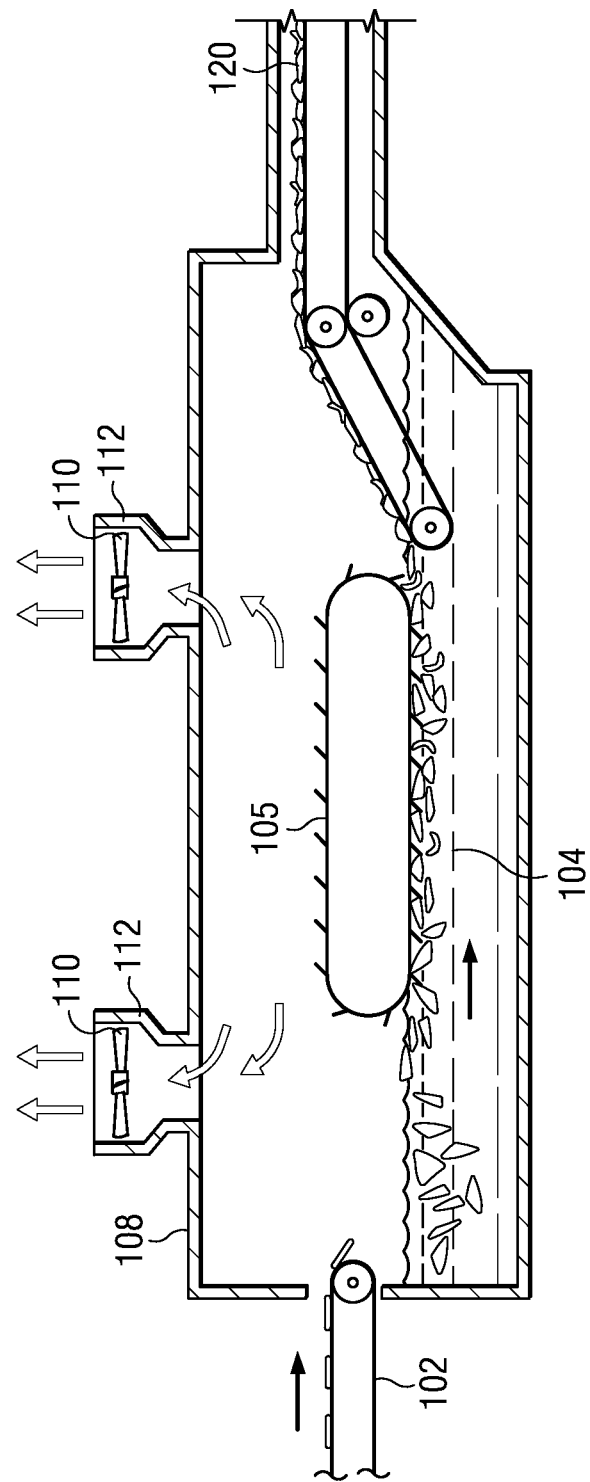
FIG. 1 is a schematic illustration of a prior art fryer.
Figure 2:
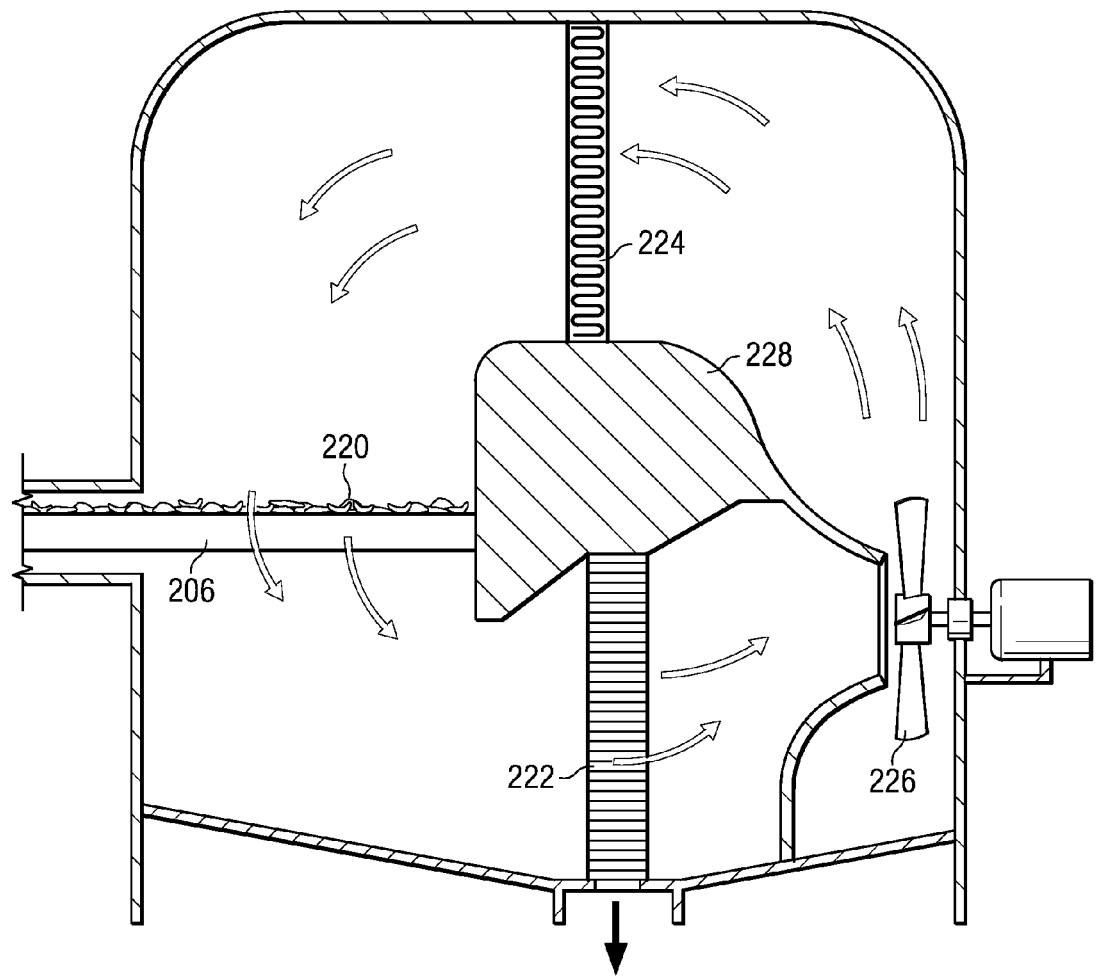
FIG. 2 is a schematic illustration of a prior art low-fat stripping unit.
Figure 3:
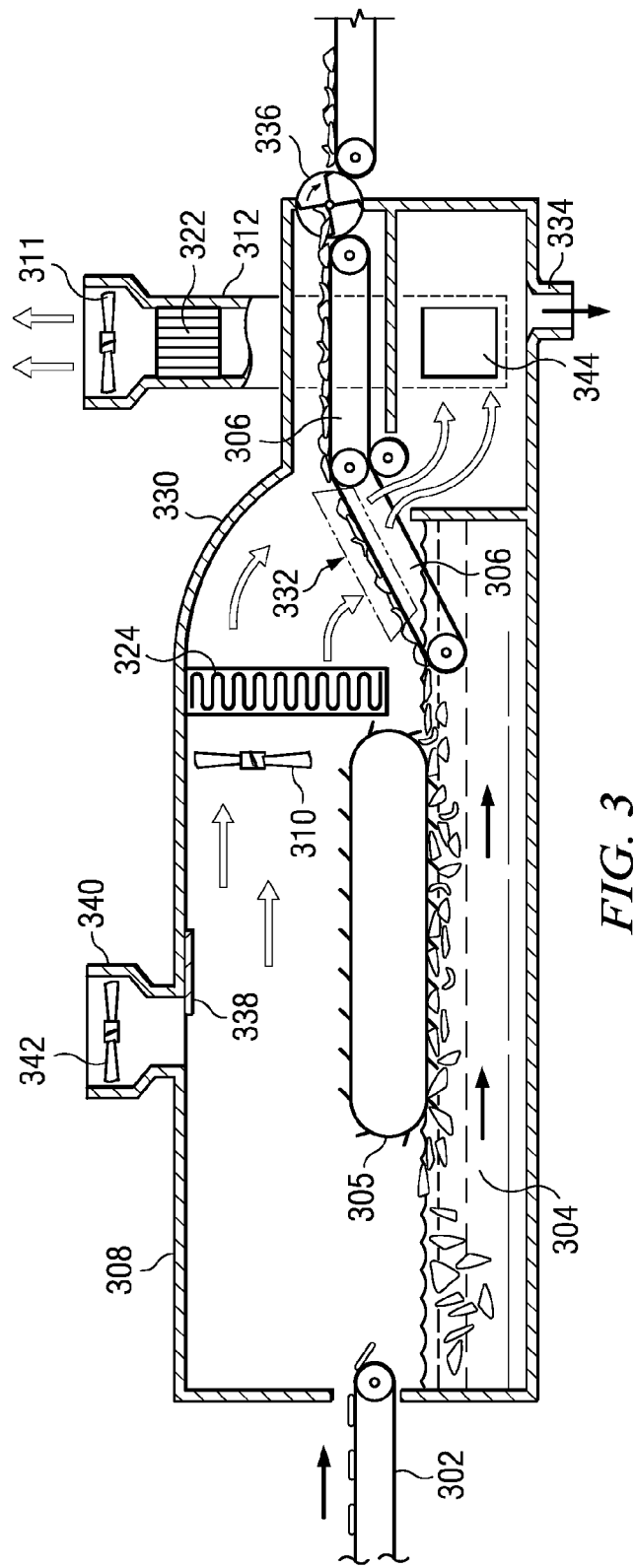
FIG. 3 is a schematic illustration of a fryer with built-in stripping capabilities of one embodiment of Applicants' invention.

FIG. 3 is a simplified schematic representation of one embodiment of Applicants' invention. As with a prior art fryer, Applicants' continuous fryer comprises a steam hood 308 which collects the steam produced in situ by product being fried in the hot oil 304. The product is likewise introduced into the fryer by an infeed conveyor 302. However, the hood 308 of Applicants' invention does not necessarily exhaust the produced steam through exhaust ports 340 located above the frying product, as is illustrated by the exhaust ports 112 in FIG. 1. In fact, a prior art frying unit can be modified by simply closing off or restricting any such exhaust ports 112 or can maintain one or more such ports 340 (FIG. 3) with an adjustable door or closing means 338 that can restrict the flow of steam through the port 340.

As illustrated in FIG. 3, Applicants' fryer comprises one or more flow inducing devices 310, 311, such as a fan 310, for the purpose of flowing the steam through the hood from an upstream position near the slice infeed 302 to a downstream position near the output conveyor 306. Such one or more fans 310, 311 can be located in any number of areas in the hood, such as before or after the heat exchanger 324, provided that the fans induce the flow as will be described herein. For example, and without limitation, a single exhaust fan 311 can be located in the exhaust port 312 at the downstream end of the unit. This exhaust fan 311 can operate alone or in conjunction with one or more other fans 310 located within the hood 308. Likewise, one or more fans 310 located in the hood 308 can drive the steam flow with or without the benefit of an exhaust fan 311. The location, number and type of fans 310, 311 used with Applicants' invention is dependent on the desired flow characteristics, velocities, and product applications.

Applicants' invention further consists of a heat exchanger 324 located within the hood. This heat exchanger is located in close proximity to the output conveyor 306. The heat exchanger 324 is upstream from a flow diversion component 330 that is used to direct steam after it has passed through the heat exchanger 324 towards the product bed located on the output conveyor 306. The area on the output conveyor 306 that is exposed to the steam flowing through the product bed is referred to by Applicants as an oil stripping zone 332. This oil stripping zone 332 is necessarily located between the heat exchanger 324 and the flow diversion device 330. The output conveyor 306 is constructed of a porous material or design that allows for the free flow of the steam through the product bed found on the output conveyor 306 and through the output conveyor 306 itself. Once the steam is blown through the product bed on the output conveyor 306 the steam is directed out of the fryer by way of the exhaust port 312 which is accessed from an opening 344 downstream of the oil stripping zone. Product is removed from the output conveyor by way of a rotary air lock 336. Because of the rotary air lock 336, steam cannot exit the hood 308 after flowing through the stripping zone 324 by any means other than the exhaust port 312 by way of an opening 344 into said port 312.

The steam flow through the hood 308 from upstream to downstream is illustrated by the flow arrows shown in the hood 308. In a preferred embodiment, steam is collected in the hood 308 in the temperature range of about 212° F. to about 300° F. The steam is then passed through the heat exchanger 324 in order to raise the temperature of the steam to preferably in the range of about 280° F. to about 320° F. or more preferably in the range of about 300° F. to about 310° F. Steam pressure within the unit is maintained at approximately ambient levels. The steam is next directed through the product bed and the output conveyor 306 at the oil stripping zone 332. The velocity of this steam as it is blown through the oil stripping zone 332 (passes through the food pieces) is, in a preferred embodiment, less than 1,000 ft./min., and more preferably about 250 ft./min. to about 500 ft./min. This flow rate corresponds to a product production rate of about 2,000 lbs./hr. to 40,000 lbs./hr. and a steam production rate within the hood of about 500 lbs./hr. to about 10,000 lbs./hr.

Applicants have found that much lower velocities can be used for the stripping steam than has been used in the past in low-oil strippers. This is believed to be a result of not allowing the product to cool prior to stripping. The product bed is subjected to super heated steam as soon as possible after removal from the oil 304. Because the steam is super-heated as it passes through the oil stripping zone 332, the food pieces on the output conveyor 306 continue to cook, thereby driving moisture out of the food piece. This continuous cooking, without a cool down while the product is in transit to the stripper as occurs in the prior art, inhibits the absorption of further moisture by the food pieces from the contact with the steam and more efficiently drives oil out of the chip, which is then more easily stripped by the steam. Importantly, the prior art methods involve an elapsed time of typically 30 to 60 seconds, between the time product is removed from the oil 304 and when it is subject to steam stripping. Applicants' invention reduces this elapsed time to 10 seconds or less, because the product is stripped immediately after leaving the oil 304. In fact, it is preferred that stripping occur within 5 seconds of removal of the product or food pieces from the hot oil 304 by the output conveyor 306. In order to accomplish this timely stripping, the oil stripping zone 332 must start within a close proximity to the oil 304, preferably within three feet thereof, and more preferably within two feet thereof. Thus, the oil stripping zone 332 starts within three feet of the point where the output conveyor 306 is in communication with the oil 304.

After passing through the oil stripping zone 332, the steam can be further blown through an oil separator 322 before being exhausted from the frying unit. The recovered oil from the steam is then returned to the frying oil via an oil collection point 334 for further use. Alternatively, since virgin steam is being constantly produced in the hood 308, the steam can be exhausted without passing through an oil separator 332.

The steam temperature and flow rates can be adjusted as well as the product throughput in order to obtain the desired reduction in oil content of a food piece fried with Applicants' fryer. The volume of the steam can also be adjusted by a door 338 on an exhaust or relief port 340 (with its exhaust fan 342) located upstream of the heat exchanger. When excess steam collects in the hood 308, the door 338 is opened on the relief port 340 in order to vent the excess steam prior to the steam passing through the heat exchanger 324. If necessary, a fan 342 can be activated to draw the excess steam out of the hood 308. The size of the opening obtained by opening the door 338 and/or the fan 342 speed can be adjusted to ensure the desired amount of steam is removed.

In a preferred embodiment, Applicants' modified fryer produces potato chips having a finished oil content of about 28% to about 31% by weight. These potato chips also have a low moisture level, typically about 1.1% to about 1.5% by weight due to the use of the super-heated steam as previously described. Yet, Applicants' invention uses less energy to accomplish this stripping.

One embodiment of Applicants' modified fryer is constructed by modifying existing hooded continuous fryers by sealing off the exhaust ports located above the frying oil, adding an internal heat exchanger and flow inducing device, and constructing the downstream portion of the fryer such that it directs the steam through the oil stripping zone and out an added exhaust port that defines the furthest downstream point of steam within the fryer. In an alternative embodiment of Applicants' invention, a hooded continuous fryer is constructed of a hood having no or closeable/adjustable exhaust ports above the frying oil and the same configuration of the downstream heat exchanger, diversion device, and exhaust port as previously described.

The foregoing is merely illustrative of the principles of this invention, and various modifications can be made by those skilled in the art without departing from the scope and spirit of the invention. For example, while the invention has been described in the context of a potato chip frying line, it should be understood that the invention and principles involved therein are applicable to the cooking and stripping of any fried food piece, such as fried fruit chips, fried vegetable chips, other fried tuber slices such as sliced sweet potatoes, and fabricated food slices made from sheeted dough as well such as fabricated potato chips, tortilla chips, and corn chips, and other fabricated vegetable and/or fruit based chips. Thus, the starting material can be either a raw food piece or a fabricated food piece made from sheeting a dough, any of which results in an end product generically referred to by Applicants as a "chip." Applicants' invention is applicable to all hooded continuous fryers used to cook food pieces of any type.

What is claimed is:

1. A method for reducing the oil content of fried food pieces using a hooded continuous fryer, wherein said fryer comprises a heat exchanger located within the hood and an output conveyor which removes food pieces from hot oil, said method comprising the steps of:
   a) collecting in the hood steam generated by frying of the food pieces;
   b) passing said collected steam through said heat exchanger, thereby heating said steam to at least 280° F.; and
   c) passing said heated steam of step b) through the food pieces while on the output conveyor, thereby stripping oil from said food pieces.

2. The method of claim 1 wherein the velocity of the heated steam at step c) through the food pieces is less than 1,000 ft./min.

3. The method of claim 1 wherein the velocity of the heated steam at step c) through the food pieces is about 250 ft./min. to about 500 ft./min.

4. The method of claim 1 wherein the steam is heated at step b) to between about 300° F. and about 310° F.

5. The method of claim 1 further comprising the step of:
   d) exhausting the steam from the hood after step c).

6. The method of claim 1 further comprising the step of:
   d) flowing the steam through an oil separator after step c).

7. The method of claim 1 wherein step c) occurs within 10 seconds of the removal of the food pieces from the hot oil.

8. The method of claim 7 wherein step c) occurs within 5 seconds of the removal of the food pieces from the hot oil.

9. The method of claim 1 wherein step a) further comprises venting outside the hood some of the steam generated by the frying of the food pieces prior to step b).

10. The method of claim 1 wherein said fried food pieces are chips selected from the group consisting of potato chips, tortilla chips, corn chips, fruit chips, and vegetable chips.

11. The chips produced by the method of claim 10.

12. An improved method for stripping oil from a product cooked in a hot oil fryer, wherein said improvement comprises stripping oil while the product is still within a hot oil fryer and with 10 seconds of the product's removal from the hot oil.

13. The improved method of claim 12 wherein the improvement further comprises using steam produced in situ in said hot oil fryer to strip the oil from the product.

14. The improved method of claim 12 wherein said food product is chips selected from the group consisting of potato chips, tortilla chips, corn chips, fruit chips, and vegetable chips.

15. The chips produced by the improved method of claim 14.

16. The method of claim 1 wherein said passing of step c) occurs in said hood of said fryer.

\* \* \* \* \*